United States Patent [19]
Forni et al.

[11] Patent Number: 5,794,738
[45] Date of Patent: Aug. 18, 1998

[54] DISC BRAKE WITH GEAR DRIVEN ADJUSTING PISTON

[75] Inventors: Roberto Forni; Fabio Santinato; Giovanni Sacchi, all of Novara, Italy

[73] Assignee: Rockwell Heavy Vehicle Systems, Inc.

[21] Appl. No.: 747,141

[22] Filed: Nov. 12, 1996

[51] Int. Cl.⁶ .......................... F16D 55/16; F16D 65/56
[52] U.S. Cl. ........................ 188/71.9; 188/196 BA; 188/72.9
[58] Field of Search ................ 188/71.7–71.9, 188/72.7–72.9, 196 B, 196 BA, 196; 192/111 A, 111 B, 111 T

[56] References Cited

U.S. PATENT DOCUMENTS

| | | | |
|---|---|---|---|
| 4,167,989 | 9/1979 | Meyer | 188/71.9 |
| 4,615,417 | 10/1986 | Schneider et al. | 188/72.8 |
| 4,678,065 | 7/1987 | Erben et al. | 188/71.9 |
| 5,123,505 | 6/1992 | Antony | 188/196 D |
| 5,379,567 | 1/1995 | Macke et al. | 188/71.9 |
| 5,449,052 | 9/1995 | Macke et al. | 188/71.9 |
| 5,582,273 | 12/1996 | Baumgartner et al. | 188/72.9 |

FOREIGN PATENT DOCUMENTS

| | | | |
|---|---|---|---|
| 0703380 | 9/1994 | European Pat. Off. | 65/56 |

*Primary Examiner*—Robert J. Oberleitner
*Assistant Examiner*—Chris Schwartz

[57] ABSTRACT

A gear driven adjusting system adjusts the position of adjusting pistons and a load plate in a disc brake. A gear toothed section is mounted to selectably rotate with the eccentric of the disc brake system. Clearance between the eccentric and the gear toothed sector allows some rotation of the eccentric without corresponding rotation of the gear toothed section. Thus, clearance is provided between the friction material and the brake drum in a non-braking position. The gear tooth connection provides a positive drive to the adjustment system and also predictability in the amount of adjustment. An over-torque clutch is positioned in the transmission between the gear toothed section and an adjustment gear. The over-torque connection insures there will not be too much adjustment of the adjusting piston.

16 Claims, 3 Drawing Sheets

Fig-6
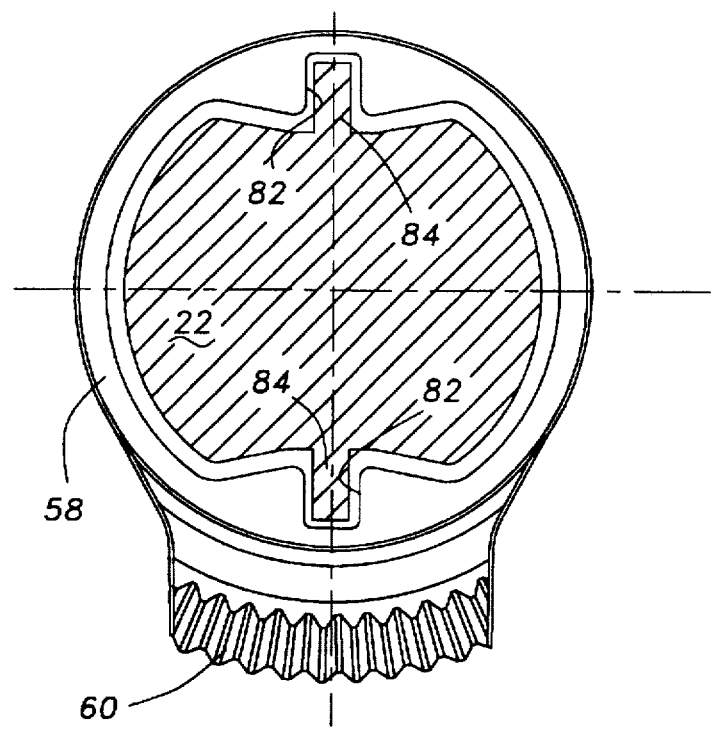
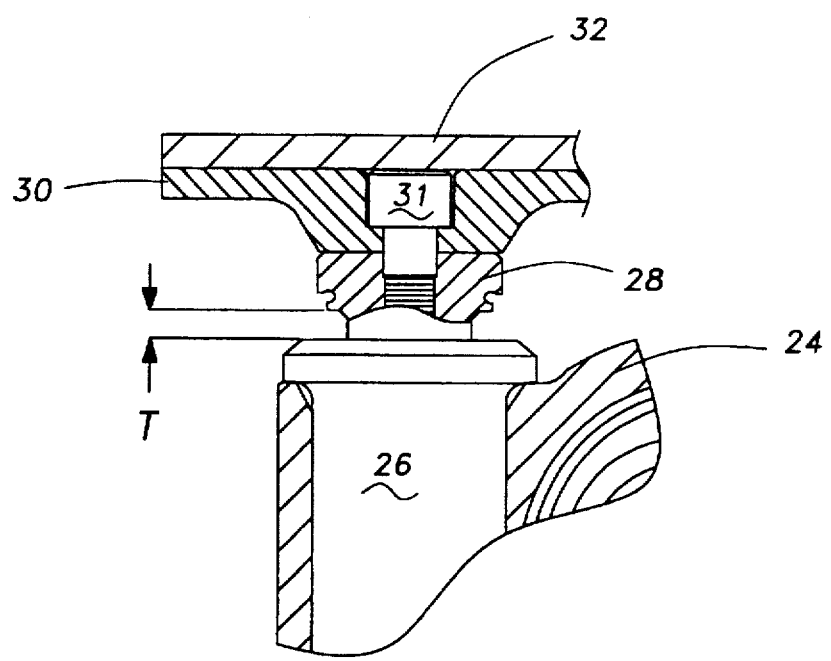
Fig-5

DISC BRAKE WITH GEAR DRIVEN ADJUSTING PISTON

BACKGROUND OF THE INVENTION

This invention relates to an improved gear driven adjusting piston for a disc brake wherein there is a direct gear drive, and also an over-torque control.

Disc brakes typically include a load plate that selectively brings a friction material from a non-braking position into contact with a rotating wheel drum. With wear, the friction material becomes thinner. Thus, the load plate must move axially further to bring the friction material into contact with the wheel drum. In the prior art, systems attempt to compensate for wear of the friction material by moving the various connecting members to result in the friction material being brought closer to the wheel drum prior to actuation. That is, with use or wear of the friction material, the non-braking position of the friction material is brought closer to the wheel drum to compensate for the thinner material.

One known adjustment structure utilizes a lever which selectively ratchets a gear member to move an adjusting piston toward the wheel drum. The adjusting piston serves as an abutment for the load plate, and thus the advancement moves the load plate and friction material towards the wheel drum.

Certain features would preferably be improved upon in the prior art structure. In one feature, the prior art connection between the adjusting lever and the structure that turns the gear is merely an abutting structure. It would be preferable to have greater control over this connection.

In addition, there has been no control of the amount of torque to be transferred through the adjustment structure. In some applications, it would be desirable to have the ability to not adjust the position of the adjusting piston should there be too much torque transferred through the adjusting structure. As one example, if the friction material is already in contact with the wheel drum, and yet there is a further force tending to move the load plate towards the wheel, it may be desirable to not have further adjustment of the friction material.

SUMMARY OF THE INVENTION

In a disclosed embodiment of this invention, an adjusting gear section is mounted to rotate with an eccentric. The eccentric drives the adjusting gear section to in turn move the load plate towards the wheel drum. The adjusting gear section includes gear teeth over a limited circumferential extent. Those gear teeth engage mating gear teeth on the outer peripheral surface of an outer adjusting housing. The outer adjusting housing is connected through a transmission to an adjusting gear, which drives other gears to rotate an adjusting sleeve. When the adjusting sleeve is rotated it advances an adjusting piston toward the wheel drum to compensate for wear. The use of the direct gear teeth connection between the adjusting gear section and the outer adjusting housing results in control over the amount of adjustment, and also insures adjustment.

The adjusting gear section preferably includes a clearance in its fit on the eccentric. There is a limited range of rotation of the eccentric before the adjusting gear section begins to rotate. This clearance is selected to achieve a desired clearance between the friction material and the wheel drum in the non-braking position.

In other features of this invention, an over-torque clutch is placed in the transmission between the adjusting gear section and the adjusting sleeve. In one embodiment the over-torque clutch transmits rotation from the outer adjusting housing to an inner housing. Preferably, the over-torque connection includes a plurality of balls, spring biased from the inner housing into slots in the outer housing. If too much torque is transmitted through this connection, the balls move out of the slots allowing the outer adjusting housing to rotate relative to the inner adjusting housing. This prevents the transmission of undue levels of torque.

In another aspect of this invention, a one-way clutch is mounted between the inner adjusting housing and the adjusting gears. In this way, when there is reversal of the eccentric, such as when moving from the braking position to the non-braking position, there is not reversal of the adjustment.

These and other features of the present invention can be best understood from the following specification and drawings, the following of which is a brief description.

BRIEF DESCRIPTION OF THE DRAWINGS

FIG. 5 shows adjustment of the brake system.

FIG. 6 is a cross sectional view of along line 6—6 as shown in FIG. 2.

DETAILED DESCRIPTION OF PREFERRED EMBODIMENT

Figure 1:
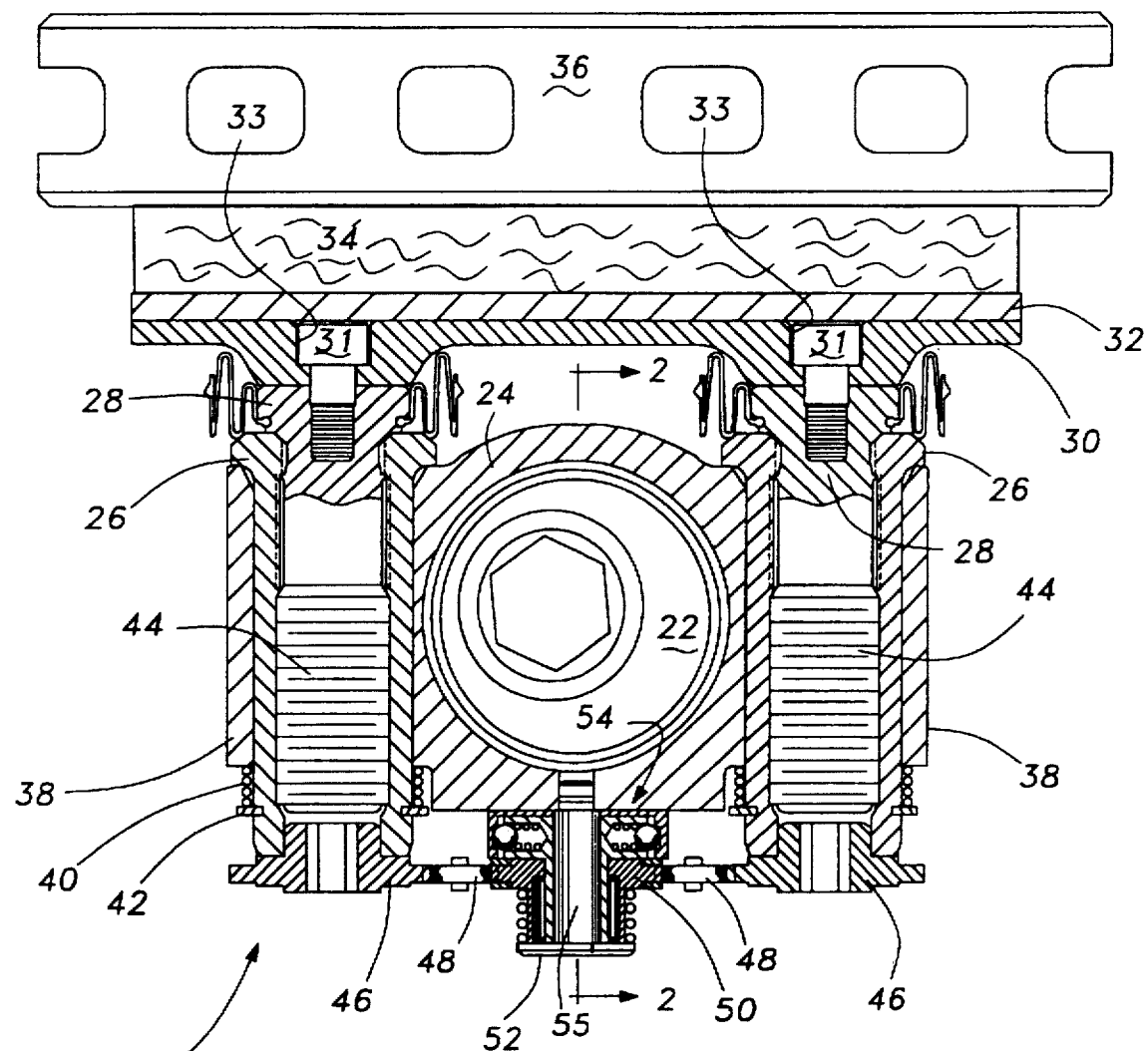
FIG. 1 is a cross sectional view through a brake incorporating the present invention.

A disc brake system 20 is illustrated in FIG. 1. Brake system 20 incorporates an eccentric 22 which is selectably rotated to actuate a brake. An actuation block 24 is reciprocated by the rotating eccentric 22. When actuation block 24 is moved (toward the top of the page in FIG. 1), it drives adjusting sleeve 26. This in turn drives adjusting piston 28 forwardly. Load plate 30 is bolted 31 to adjusting piston 28. A brake pad including a backing plate 32 and friction material 34 is secured to load plate 30. The friction material 34 is shown with the brake actuated and in contact with the rotor 36. The friction material 34 is kept slightly out of contact with the rotor 36 in a non-braking position.

The bolts 31 securing load plate 30 to the adjusting piston 28 provides a rigid connection. In this way, the force transmitted through block 24 is directly perpendicular to backing plate 22, and friction material 34. Thus, the wear on the friction material 34 is uniform. In the prior art, the wear has sometimes been tangential due to non-direct application of the actuating force. This aspect of the invention is better disclosed in co-pending application entitled "Disc Brake with Rigid Connection Between Load Plate and Adjusting Piston", Ser. No. 08/747,139.

As shown, the load plate 30 includes bolt holes 33 extending from a side of the load plate that is to receive the friction material 30. The backing plate 32 and friction material 34 closes bolt holes 33. Bolts 31 extend through the bolt hole 33 and into adjusting pistons 28. Thus, a reliable and secure connection is provided.

Block 24 includes outer portion 38 that surrounds sleeves 26. A spring 40 biases sleeves 26 downwardly against block 24. A clip 42 provides a reaction surface for the spring 40, and is secured to sleeve 26. A threaded adjustment connection 44 between adjusting piston 28 and adjusting sleeve 26 allows for axial adjustment of the relative location of the piston and sleeve to adjust for wear of the friction material 34.

A gear 46 is fixed to rotate with each sleeve 26. The adjusting pistons 28 are constrained against rotation by bolts 31, and rotation of sleeves 26 moves pistons 28 forwardly due to the threaded connection 44. This brings the location of the friction material 34 closer to the rotor 36. Gear 46 is rotated, through idler gears 48, by an adjustment gear 50. A one-way clutch 52 insures that adjustment gear 50 is only rotated in a direction which causes the gears 46 to rotate and move friction material 34 closer to the rotor 36. The one-way clutch 52 does not allow reverse rotation. The one-way clutch 52 may be a needle bearing one-way clutch as is known in the art. An over-torque load clutch 54 is also included and will be explained in more detail below. A pin 55 is fixed in block 24 and provides a mount spindle for clutch 54.

Figure 2:
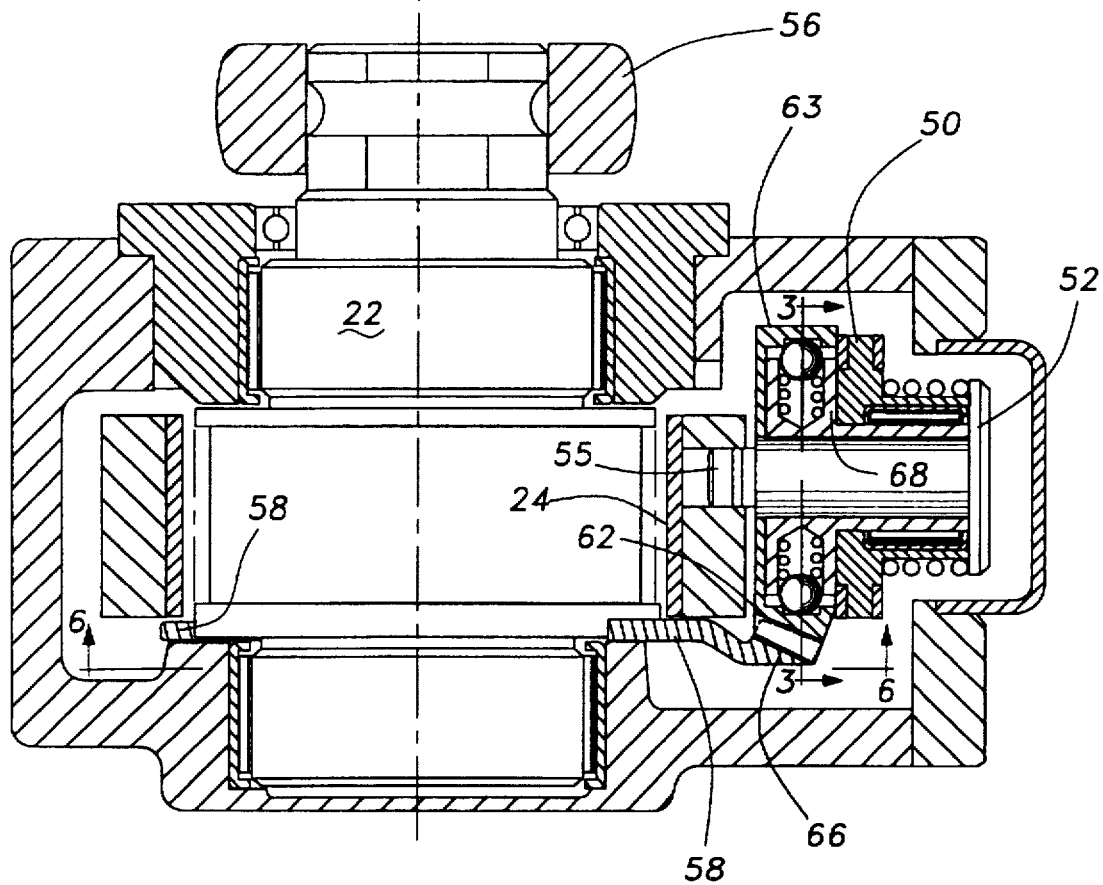
FIG. 2 is a cross sectional view along line 2—2 as shown in FIG. 1.

Brake 20 is shown in FIG. 2 with an actuating lever 56 connected to a drive, not shown. When actuating member 56 is moved, it rotates the eccentric 22 to in turn move the friction material to the braking position as explained above. An adjustment gear section 58 rotates with the eccentric 22. Gear section 58 includes a sector having teeth 60. Teeth 60 engage mating gear teeth 62 on an outer adjusting housing 63 which is incorporated into the over-torque clutch 54. Outer adjusting housing 63 rotates an inner adjusting housing 68 through the over-torque clutch 54. Inner adjusting housing 68 rotates adjustment gear 50 through the one-way clutch 52.

Figure 3:
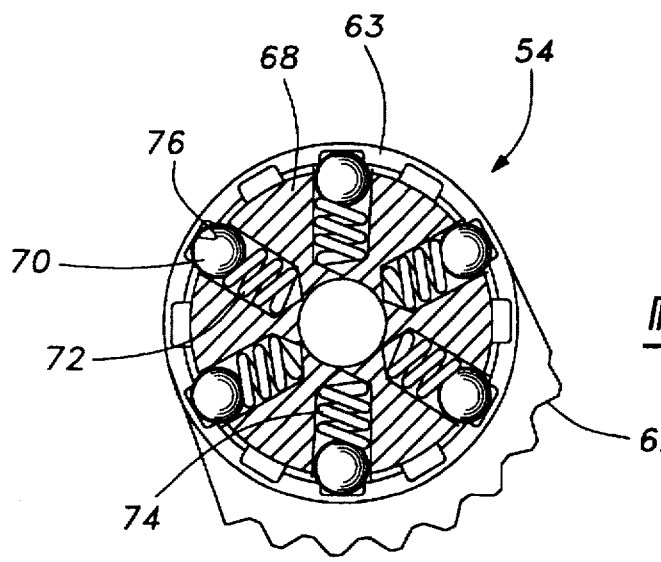
FIG. 3 is a cross sectional view along line 3—3 as shown in FIG. 2.

FIG. 3 shows the over-torque clutch 54. Inner housing 68 is received within the outer housing 63. Balls 70 are spring biased 72 outwardly of slots 74 in inner housing 68, and into grooves 76 in the outer housing 63.

Due to over-torque clutch 54, should there be continuing turning of the eccentric after the friction material is in contact with the drum, the over-torque connection allows slippage, and thus no further adjustment of the adjusting pistons 28. Instead, the clutch will allow the outer housing 63 to rotate relative to the inner housing 68.

Figure 4:
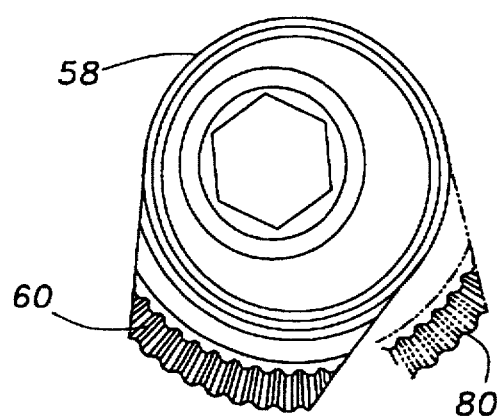
FIG. 4 is a view of an adjustable gear member.

As shown in FIG. 4, the adjustment gear section 58 includes teeth 60. During rotation of the eccentric 22 teeth 60 turn through a portion of a circle to a position such as shown in phantom at 80. During this turning the teeth drive teeth 62 and housing 63.

The basic operation of the adjustment system can now be understood with reference to the drawings. Upon receiving a signal to brake, the wheel lever 56 rotates eccentric 22. Eccentric 22 moves actuating block 24 to move sleeves 26, pistons 28, load plate 30, backing plate 32, and friction material 34 toward the rotor 36.

At the same time, rotation of eccentric 22 may cause rotation of adjusting gear section 58. As will be explained below, there is some limited movement of eccentric 22 before there is corresponding movement of the gear section 58. Teeth 60 rotate teeth 62 and housing 63. If there has been sufficient wear of the friction material 34, over-torque clutch 54 drives internal adjusting housing 68. This in turn rotates the adjustment gear 50 through the one-way clutch 52. Rotation of gear 50 causes rotation of the idler gears 48 and adjustment gears 46. This causes adjusting sleeves 26 to rotate. Adjusting pistons 28 thus are advanced carrying the friction material toward the rotor 36. When eccentric 22 returns to its non-braking position, one-way clutch 52 allows the housings 63 and 68 to return to a starting position without reversing any adjustment.

FIG. 5 shows the adjustment achieved by the inventive structure. As shown, the piston 28 has advanced by a distance T from the position shown in FIG. 1. The head of the piston 28 no longer abuts the head of the adjusting sleeve 26. However, the adjusting sleeve still drives the piston 28 forwardly when the block 24 is moved due to the threaded connection.

FIG. 6 shows eccentric 22 received within a central bore on adjustment gear section 58. Grooves 82 are formed at two locations on the gear section 58. Tabs 84 from eccentric 22 are received in grooves 82. The tabs 84 are smaller than groove 82, providing a clearance. In one example, tabs 84 were approximately 6 millimeter while grooves 82 were 8 millimeters. Thus, there is a limited amount of rotation of the eccentric before the gear section 58 will begin to turn. This allows the system to maintain a clearance between the friction material 34 and the rotor 36. That is, there will be some initial movement of the eccentric before there is any adjustment through the gear section 58. When the friction material 34 has been replaced or is new, there may be no adjustment due to this clearance. As wear occurs, more and more adjustment occurs.

To remove the friction pad 34 when fully worn, the pistons 28 must be withdrawn. To achieve this, the gears 46 are rotated in a reverse direction, and the piston 28 moves back into the sleeve 26.

Preferred embodiment of this invention has been disclosed, however, a worker in the art would recognize that certain modifications will come within the scope of this invention. For that reason, the following claims should be studied to determine the true scope and content of this invention.

We claim:

1. A disc brake system comprising:

an eccentric to be connected to an actuating source;

an actuating member to be reciprocated by said eccentric when said eccentric is rotated;

a load plate to be attached to a friction material, said load plate being reciprocated upon reciprocation of said actuating member;

at least one adjusting piston for adjusting the relative positions of said actuating member and said load plate to move said load plate toward a wheel component;

a transmission for selectively transmitting rotation of said eccentric to move said adjustment piston, said transmission including a gear toothed member selectively engaging gear teeth on an outer housing, rotation of said outer housing causing movement of said adjusting piston; and said gear toothed member being a circumferential section of a gear including a plurality of gear teeth, there being a plurality of gear teeth on said outer housing engaged by said gear teeth on said gear toothed member, and said gear toothed member selectively rotating with said eccentric to in turn selectively rotate said outer housing through said plurality of said engaging gear teeth.

2. A disc brake system as recited in claim 1, wherein said transmission further includes an over-torque clutch to prevent transmission of rotation from said gear section to said adjusting piston if a predetermined torque load is exceeded.

3. A disc brake system as recited in claim 2, wherein said gear section engages gear teeth on said outer housing, said over-torque clutch being mounted between said outer housing and an inner housing, said inner housing being operable to transmit rotation to an adjusting gear which in turn causes said adjusting piston to be advanced.

4. A disc brake system as recited in claim 3, wherein said over-torque clutch includes a plurality of balls which are spring biased into slots in said outer housing, said balls being spring biased outwardly of slots in said inner housing, and said inner and outer housings rotating together if said predetermined torque limit is not exceeded.

5. A disc brake system as recited in claim 3, wherein said inner housing driving said adjusting gear through a one-way clutch such that rotation of said inner housing in a first direction causes adjustment of said adjusting piston, but said inner housing is allowed to rotate which in an opposed direction does not cause adjustment of said adjusting piston.

6. A disc brake system as recited in claim 2, wherein there is also a one-way clutch mounted in said transmission such that rotation in a first direction of said eccentric causes adjustment of said adjusting piston, but rotation in an opposed direction does not cause any adjustment.

7. A disc brake system as recited in claim 1, wherein said gear section is received on a shaft of said eccentric, and there is clearance between said eccentric and said gear section.

8. A disc brake system as recited in claim 7, wherein one of said gear section and said eccentric shaft has a slot of a first dimension, the other having a tab received in said slot and of a second dimension, said second dimension being smaller than said first dimension to provide said clearance.

9. A disc brake system comprising:

an eccentric to be connected to an actuating source;

an actuating member to be reciprocated by said eccentric when said eccentric is rotated;

a load plate to be attached to a friction material, said load plate being reciprocated upon reciprocation of said actuating member;

at least one adjusting piston for adjusting the relative positions of said actuating member and said load plate to move said load plate toward a wheel component;

a transmission for transmitting rotation of said eccentric to cause adjustment of said adjusting pistons, said transmission including an over-torque clutch such that once a pre-determined torque limit is exceeded, further advancement of said adjusting piston will be stopped; and said over-torque clutch including a plurality of balls spring biased into one of an inner and outer housing, said balls being spring biased outwardly of slots in the other of said inner and outer housings, said inner and outer housing rotating together if said predetermined torque limit is not exceeded.

10. A disc brake system as recited in claim 9, wherein said transmission including an adjusting member selectively moved by said eccentric upon rotation of said eccentric, said adjusting member turning said outer adjusting housing, said over-torque clutch being mounted between said outer adjusting housing and said inner adjusting housing, said inner adjusting housing being operable to transmit rotation to an adjusting gear which in turn causes said adjusting piston to be advanced.

11. A disc brake system as recited in claim 9, wherein said inner housing driving said adjusting gear through a one-way clutch such that rotation of said inner housing in a first direction causes adjustment of said adjusting piston, but rotation of said inner housing in an opposed direction does not cause adjustment of said adjusting piston.

12. A disc brake as recited in claim 9, wherein said are in said inner housing and said balls are biased into said outer housing.

13. A disc brake system comprising:

an eccentric to be connected to an actuating source;

an actuating member to be reciprocated by said eccentric when said eccentric is rotated;

a load plate to be attached to a friction material, said load plate being reciprocated upon reciprocation of said actuating member;

at least one adjusting piston for adjusting the relative positions of said actuating member and said load plate to move said load plate toward a wheel component;

a transmission for selectively transmitting rotation of said eccentric to adjustment of said adjustment piston, said transmission including a gear toothed member selectively engaging gear teeth on an outer housing, said outer housing being operable to move said adjusting piston through said transmission, and an over-torque clutch functionally disposed between said gear toothed member and said adjusting piston such that once a pre-determined torque limit is exceeded, further advancement of said adjusting piston will be stopped; and said gear toothed member being a circumferential section of a gear including a plurality of gear teeth, there being a plurality of gear teeth on said outer housing engaged by said gear teeth on said gear toothed member, and said gear toothed member selectively rotating with said eccentric to in turn selectively rotate said outer housing through said plurality of said engaging gear teeth.

14. A disc brake system as recited in claim 13, wherein one of said gear toothed member and said eccentric shaft has a slot of a first dimension, the other having a tab received in said slot and of a second dimension, said second dimension being smaller than said first dimension to provide said clearance.

15. A disc brake system as recited in claim 14, wherein said over-torque clutch being mounted between said outer housing and an inner housing, said inner housing being operable to transmit rotation to an adjusting gear which in turn causes said adjusting piston to be advanced.

16. A disc brake system as recited in claim 15, wherein said inner housing driving said adjusting gear through a one-way clutch such that rotation of said inner housing in a first direction causes adjustment of said adjusting piston, but rotation of said inner housing in an opposed direction does not cause adjustment of said adjusting piston.

* * * * *